(12) United States Patent
Chen et al.

(10) Patent No.: US 6,785,955 B1
(45) Date of Patent: Sep. 7, 2004

(54) METHOD FOR PROVIDING PEDESTAL-DEFINED ZERO THROAT WRITER

(75) Inventors: Yingjian Chen, Fremont, CA (US); Hugh Craig Hiner, Fremont, CA (US); Benjamin Chen, San Jose, CA (US); Xizeng Shi, Fremont, CA (US); Kyusik Sin, Palo Alto, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 09/769,060

(22) Filed: Jan. 23, 2001

(51) Int. Cl.[7] .................. H04R 31/00; G11B 5/127
(52) U.S. Cl. ................. 29/603.24; 29/603.07; 29/603.12; 29/603.13; 29/603.14; 29/603.16; 29/603.18; 300/122; 300/126; 216/13; 216/24; 216/91
(58) Field of Search .................. 29/603.04, 603.07, 29/603.12, 603.13, 603.14, 603.16, 603.18, 603.23, 603.24; 360/120, 122, 125, 126; 216/13, 24, 91, 100, 102, 105

(56) References Cited

U.S. PATENT DOCUMENTS

| | | | | |
|---|---|---|---|---|
| 5,877,924 A | * | 3/1999 | Saito ........................ | 360/126 |
| 5,935,644 A | * | 8/1999 | Heim et al. ................. | 427/116 |
| 6,154,346 A | * | 11/2000 | Sasaki ........................ | 360/317 |
| 6,156,375 A | * | 12/2000 | Hu et al. ..................... | 427/116 |
| 6,466,415 B1 | * | 10/2002 | Terunuma et al. .......... | 360/317 |

* cited by examiner

Primary Examiner—A. Dexter Tugbang
Assistant Examiner—Paul Kim
(74) Attorney, Agent, or Firm—Sawyer Law Group LLP

(57) ABSTRACT

A method and system for providing a writer is disclosed. The method and system include providing a first pole, an insulator covering a portion of the first pole and a coil on the first insulator. The coil includes a plurality of turns. The method and system also include providing a second insulator covering the coil, providing a second pole on the second insulator and providing a write gap separating a portion of the first pole from a second portion of the second pole. A first portion of the second pole is coupled with the first pole. In one aspect, the method and system include providing a coil having a plurality of turns with a pitch of no more than 1.2 micrometers. In another aspect, the plurality of turns of the coil is provided using a hard mask layer on a photoresist layer. A portion of the hard mask layer and a portion of the photoresist layer define a plurality of spaces between the pluralities of turns of the coil. In another aspect, the writer is a pedestal defined zero throat writer. In this aspect, the first insulator has a depression therein and the coil is provided on the depression.

6 Claims, 14 Drawing Sheets

US 6,785,955 B1

METHOD FOR PROVIDING PEDESTAL-DEFINED ZERO THROAT WRITER

FIELD OF THE INVENTION

The present invention relates to magnetic recording, and more particularly to a method and system for providing a writer with improved performance due to the properties of the coil.

BACKGROUND OF THE INVENTION

Inductive writers are typically used to write data to recording media. Inductive writers can be broken into two types based on how their zero-throat position is defined. The zero throat for an inductive writer is the position at which the first and second poles begin to diverge at the back edge of the write gap. For example, FIG. 1 depicts one conventional inductive writer 10 with a pedestal defined zero throat. The conventional writer 10 is typically part of a merged head that includes both a reader (not shown) and the conventional writer 10. The conventional writer 10 includes a first pole 12 having a pedestal 14, a first insulator 16, a coil 18, a second insulator 20, a second pole 22 and a write gap 24 defined by the insulator-filled space between the first pole 12 and the second pole 22. The first pole 12 and the second pole 22 are coupled through layer 21. Although the coil 18 is shown as having six turns, typically the coil has another number of turns. As can be seen in FIG. 1, the pedestal 14 diverges from the front of the second pole 22 at the position marked by the arrow 23. At this position, a portion of the first insulator 16 is flush with the pedestal 14. Also at this point, the pedestal 14 draws away from the second pole 22. Thus, the zero throat is defined by the pedestal 14. The coil 18 typically has a pitch of approximately, 1.5 micros, with the narrowest width of the turns as 1.1–1.2 microns with a turn separation of 0.3–0.4 microns. When a current is driven through the coil 18, magnetic field is concentrated at the write gap 24 by the poles 12 and 22. The edge of the writer 10 near the write gap 24 is at the air-bearing surface ("ABS"), in proximity to the media. Thus, the conventional writer 10 can write to the media.

FIGS. 2A and 2B depict conventional writers 10' and 10", respectively, in which the zero throat position is defined by the second insulator 20' and 20", respectively. Portions of the conventional writers 10' and 10" are analogous to portions of the conventional writer 10 depicted in FIG. 1. Consequently, portions of the conventional writers 10' and 10" are labeled similarly. For example, the conventional writers 10' and 10" include a first pole 12' and 12", respectively. As can be seen in FIG. 2A, the second pole 22' separates from the first pole 12' due to the second insulator 20' at the position marked by the arrow 23'. Similarly, in FIG. 2B, the second pole 22" separates from the first pole 12" due to the second insulator 20" at the position marked by the arrow 23". Thus, the conventional writer 10' and 10" define the zero throat position using the second insulator. The conventional writers 10' and 10" function in the same manner as the conventional writer 10. The conventional writer 10" differs from the conventional writer 10' in that the coil 18" is sinked, residing on a depression in the first insulator 16".

FIG. 3A depicts a flow-chart of a conventional method 50 for providing the conventional writers 10 and 10'. The first pole is provided, via step 52. The first insulator and pedestal are provided, via steps 54 and 56, respectively. The first insulator and pedestal are then planarized, via step 58. The write gap layer is then provided, via step 60. The coil is provided, via steps 62 through 66. A layer of photoresist is provided on the write gap, via step 62. The photoresist is then patterned to provide a mask, via step 64. The apertures in the mask are over locations on the first insulator where the coil will be plated. Thus, portions of the mask remaining indicate the spaces between the turns of the coil. The coil is then deposited, via step 66. Typically, the coil is plated in step 66. The coil typically has a pitch of no less than 1.5 microns, with spaces between the turns of the coil accounting for approximately 0.3–0.4 of the pitch. The second insulator and second pole are then provided, via steps 68 and 70, respectively. Depending upon whether the writer is a conventional pedestal defined zero throat writer 10 or a conventional second insulator defined zero throat writer, the second insulator may diverge from the write gap differently.

FIG. 3B depicts a conventional method 80 for providing the writer 10" in which the coil 18" is sinked. The first pole is provided, via step 82. The first insulator is provided, via step 84. The first insulator provided in step 84 is very thin, allowing the coil to be provided for the writer to be sinked such that the bottom of the coil is lower than the top of the pedestal, as in the writer 10". The pedestal is then provided, via step 86. The pedestal is built up in step 86 such that the top of the pedestal is higher than the top of the first insulator. The write gap layer is then provided, via step 88. The coil is provided, via steps 90 through 94. A layer of photoresist is provided on the write gap, via step 90. The photoresist is then patterned to provide a mask, via step 92. The apertures in the mask are over locations on the first insulator where the coil will be plated. Thus, portions of the mask remaining indicate the spaces between the turns of the coil. The coil is then deposited, via step 94. Typically, the coil is plated in step 94. The coil typically has a pitch of no less than 1.5 microns, with spaces between the turns of the coil accounting for approximately 0.3–0.4 of the pitch. The second insulator and second pole are then provided, via steps 96 and 98, respectively. Depending upon whether the writer is a conventional pedestal defined zero throat writer 10 or a conventional second insulator defined zero throat writer, the second insulator may diverge from the write gap differently.

Although the conventional writers 10, 10' and 10" function, one of ordinary skill in the art will readily realize that there are several drawbacks to the conventional writers 10, 10' and 10". The second insulator defined zero throat writers 10' and 10" have poorer overwrite performance than the conventional pedestal defined zero throat writer 10. Thus, it is more difficult to overwrite data using the conventional writers 10' and 10" than the conventional writer 10. This is particularly true for low currents driven in the coil 18, 18' and 18'. In addition, the writer 10 has a better controlled track width than the conventional writers 10' and 10" because the second insulator 20, which has a significant topography, is located farther from the edge of the conventional writer 10 that will be at the ABS. Thus, for many applications, the conventional writer 10 is preferred over the conventional writers 10' and 10".

However, one of ordinary skill in the art will readily realize that there are also drawbacks to the conventional writer 10. The conventional writer 10 has an apex angle. The apex angle is the angle the second pole 22 makes at the zero throat. This apex angle must be accounted for when placing the coil 18 in the writer 10. The front turn of the coil 18 must be placed far enough away from the zero throat, and thus from the ABS, to ensure that the coil 18 is insulated from the second pole 22. This also ensures that the track width can be controlled for the second pole 22. Placing the coil 18 farther from the ABS reduces the efficiency of the combination of the coil 18 and poles 12 and 22 in providing a high magnetic field near the write gap at the ABS. Thus, the efficiency of the conventional writer 10 is reduced.

One of ordinary skill in the art will also readily realize that the conventional writers 10, 10' and 10" have a relatively long yoke. The yoke is the length of the first poles 12, 12', and 12" and the second poles 22, 22' and 22" from the ABS. The yoke is long because of the coil 18, 18' and 18". The coil 18, 18' and 18" is desired to have a certain number of turns to generate sufficient magnetic flux for writing data using the writer 10, 10' and 10", respectively. In addition, the pitch of the coil 18, 18' and 18" is at least 1.5 microns or longer. The coils 18, 18' and 18" often are fabricated in situations where there is significant topography in the region of the coils 18, 18' and 18", Thus, reducing the pitch of the coil or fabricating a double layer of coils using the conventional photolithographic techniques described in FIG. 1 is difficult. Thus, the yoke of the poles 12, 12' and 12" and 22, 22' and 22' remains relatively long. A longer yoke has a lower writing efficiency. In addition, the coil 18, 18' or 18" may be longer and have a higher inductance. As a result, the coil 18, 18' and 18" has a lower switching speed. Consequently, the speed of the conventional writers 10, 10' and 10" is lower. In addition, a longer yoke reduces the efficiency of the writer 10, 10' and 10". Thus, the conventional writers 10, 10' and 10" have reduced speed and efficiency.

Accordingly, what is needed is a system and method for providing a writer with improved efficiency and performance. The present invention addresses such a need.

SUMMARY OF THE INVENTION

The present invention provides a method and system for providing a writer. The method and system comprise providing a first pole, an insulator covering a portion of the first pole and a coil on the first insulator. The coil includes a plurality of turns. The method and system also comprise providing a second insulator covering the coil, providing a second pole on the second insulator and providing a write gap separating a portion of the first pole from a second portion of the second pole. A first portion of the second pole is coupled with the first pole. In one aspect, the method and system include providing a coil having a plurality of turns with a pitch of no more than 1.2 micrometers. In another aspect, the plurality of turns of the coil is provided using a hard mask layer on a photoresist layer. A portion of the hard mask layer and a portion of the photoresist layer define a plurality of spaces between the plurality of turns of the coil. In another aspect, the writer is a pedestal defined zero throat writer. In this aspect, the first insulator has a depression therein and the coil is provided on the depression.

According to the system and method disclosed herein, the present invention provides a writer which can have a shorter yoke due to narrower pitched coils as well as coils that are placed closer to the write gap, thereby increasing the speed and efficiency of the writer.

DETAILED DESCRIPTION OF THE INVENTION

The present invention relates to an improvement in magnetic recording. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a writer. The method and system comprise providing a first pole, an insulator covering a portion of the first pole and a coil on the first insulator. The coil includes a plurality of turns. The method and system also comprise providing a second insulator covering the coil, providing a second pole on the second insulator and providing a write gap separating a portion of the first pole from a second portion of the second pole. A first portion of the second pole is coupled with the first pole. In one aspect, the method and system include providing a coil having a plurality of turns with a pitch of no more than 1.2 micrometers. In another aspect, the plurality of turns of the coil is provided using a hard mask layer on a photoresist layer. A portion of the hardmask layer and a portion of the photoresist layer define a plurality of spaces between the pluralities of turns of the coil. In another aspect, the writer is a pedestal defined zero throat writer. In this aspect, the first insulator has a depression therein and the coil is provided on the depression.

The present invention will primarily be described in terms of an inductive writer without reference to any read head. However, one of ordinary skill in the art will readily recognize that this method and system will operate effectively for a merged head including a writer as well as a separate writer. Moreover, the present invention is preferably used in a writer that is part of a merged head. The present invention is also described in the context of a writer having a pedestal. However, nothing prevents the present invention from being used with another writer not having a pedestal.

Figure 1:
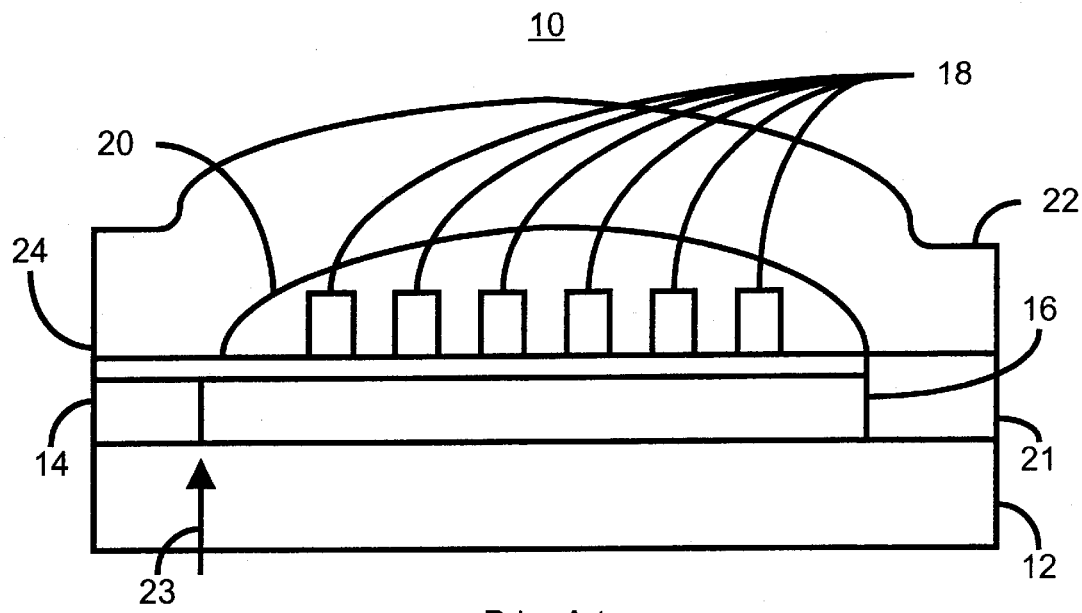
FIG. 1 is a diagram of a conventional pedestal defined zero writer.
Figure 2A:
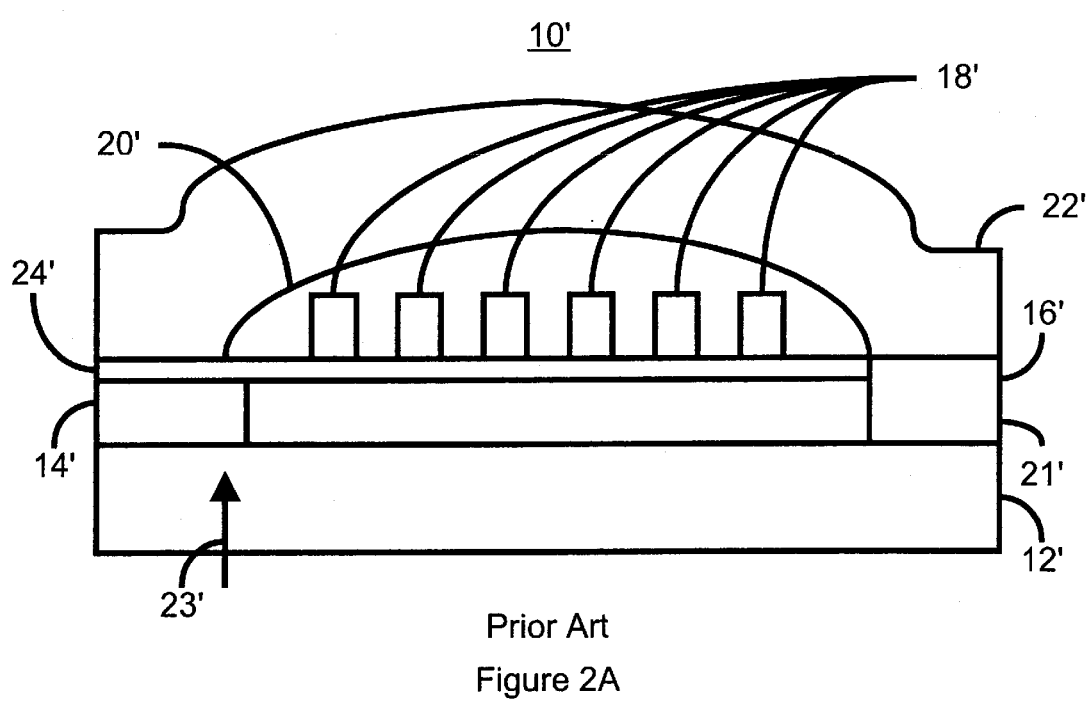
FIG. 2A is a diagram of a conventional second insulator defined zero throat writer.
Figure 2B:
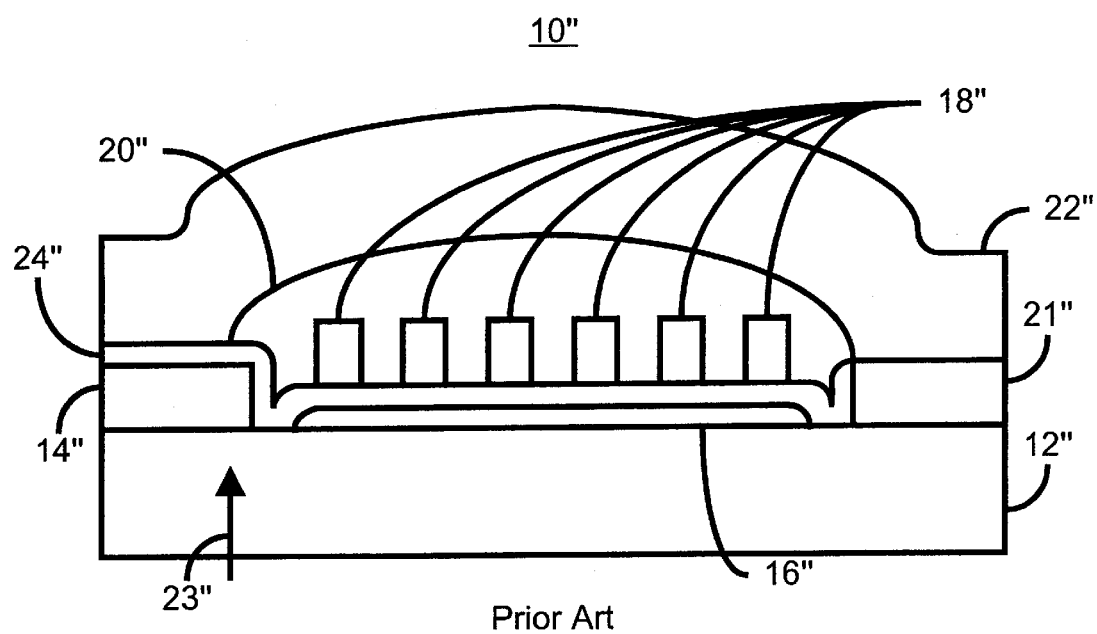
FIG. 2B is a diagram of a conventional second insulator defined zero throat writer.
Figure 3A:
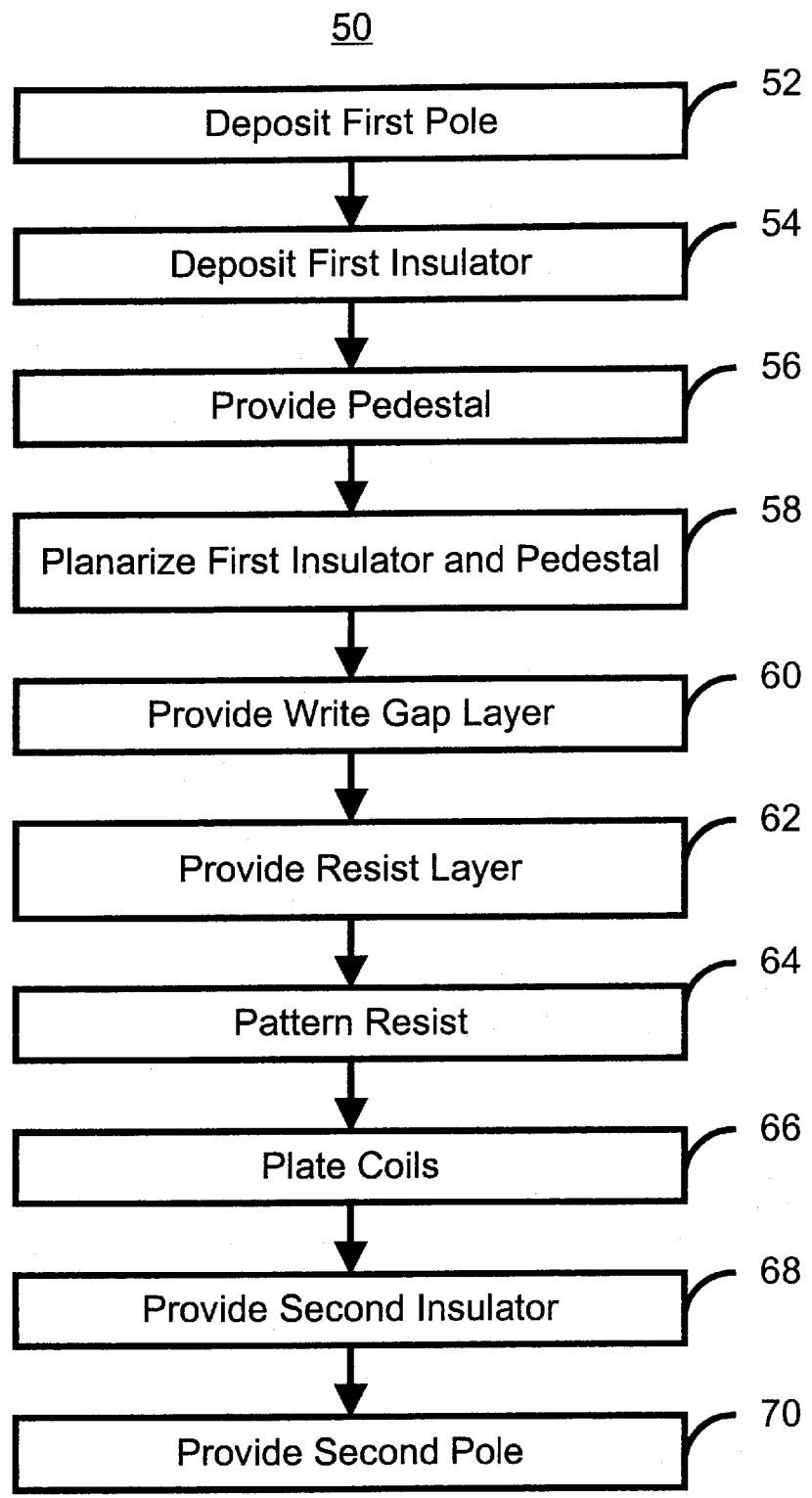
FIG. 3A is a flow chart of a conventional method for providing a conventional writer.
Figure 3B:
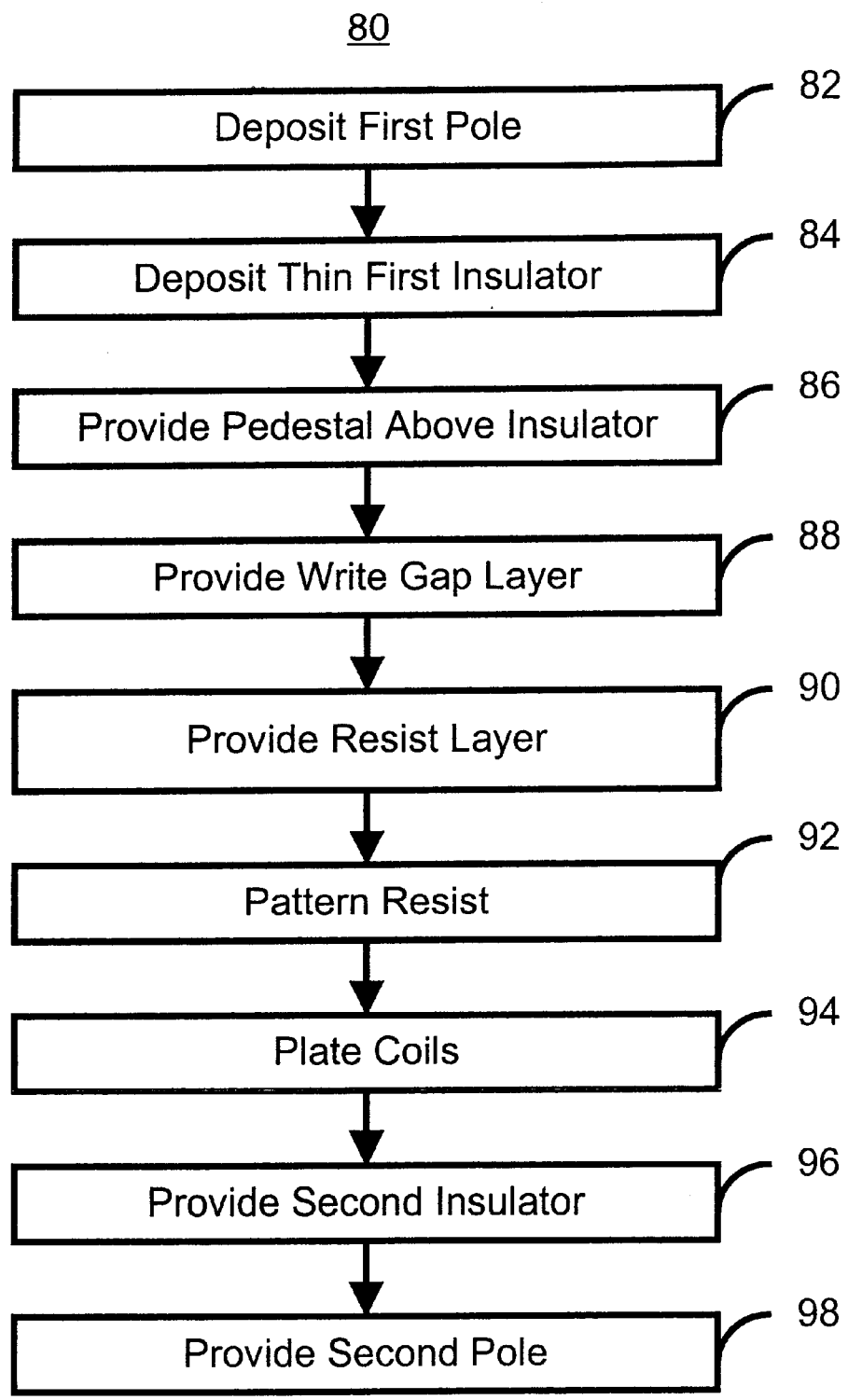
FIG. 3B is a flow chart of a conventional method for providing a conventional writer having the coil sinked.
Figure 4A:
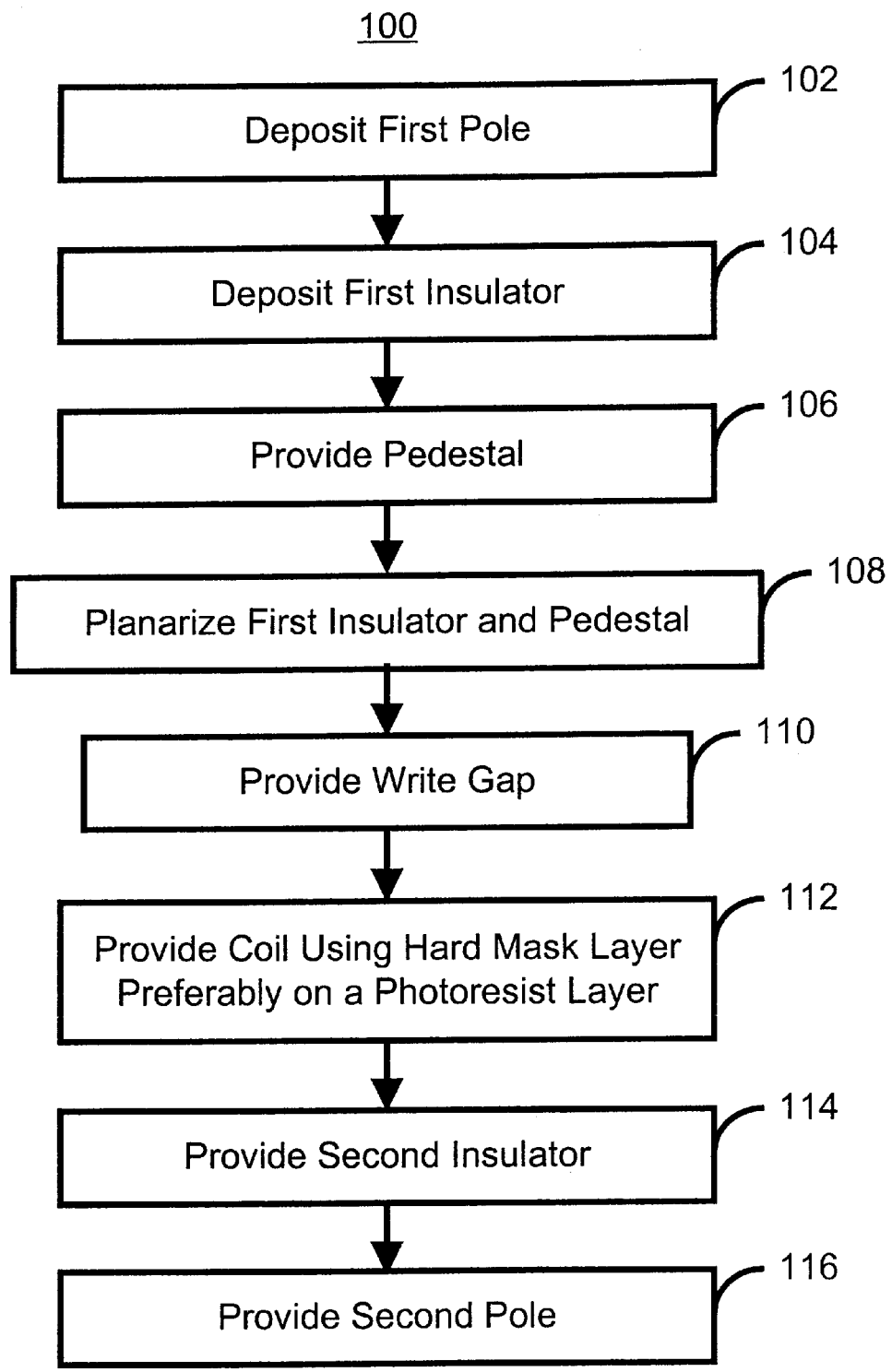
FIG. 4A is a high-level flow chart depicting one embodiment of a method in accordance with the present invention for providing a more efficient writer.

To more particularly illustrate the method and system in accordance with the present invention, refer now to FIG. 4A, depicting one embodiment of a method 100 in accordance with the present invention. The method 100 provides a writer which is capable of having a coil having a smaller pitch. The first pole is provided, via step 102. The first insulator is provided, via step 104. The pedestal can optionally be provided, via step 106. The first insulator and pedestal may then be planarized, via step 108. A write gap layer is then. provided, via step 110. The coil(s) are then provided using a hard mask, via step 112. Because the hard mask is used in step 112, the coils may be provided with a pitch of less then 1.5 microns. Preferably, the pitch of the coils provided in step 112 is less than or equal to 1.2 microns. The second insulator is also provided, via step 114. The second pole is also provided, via step 116.

Figure 4B:
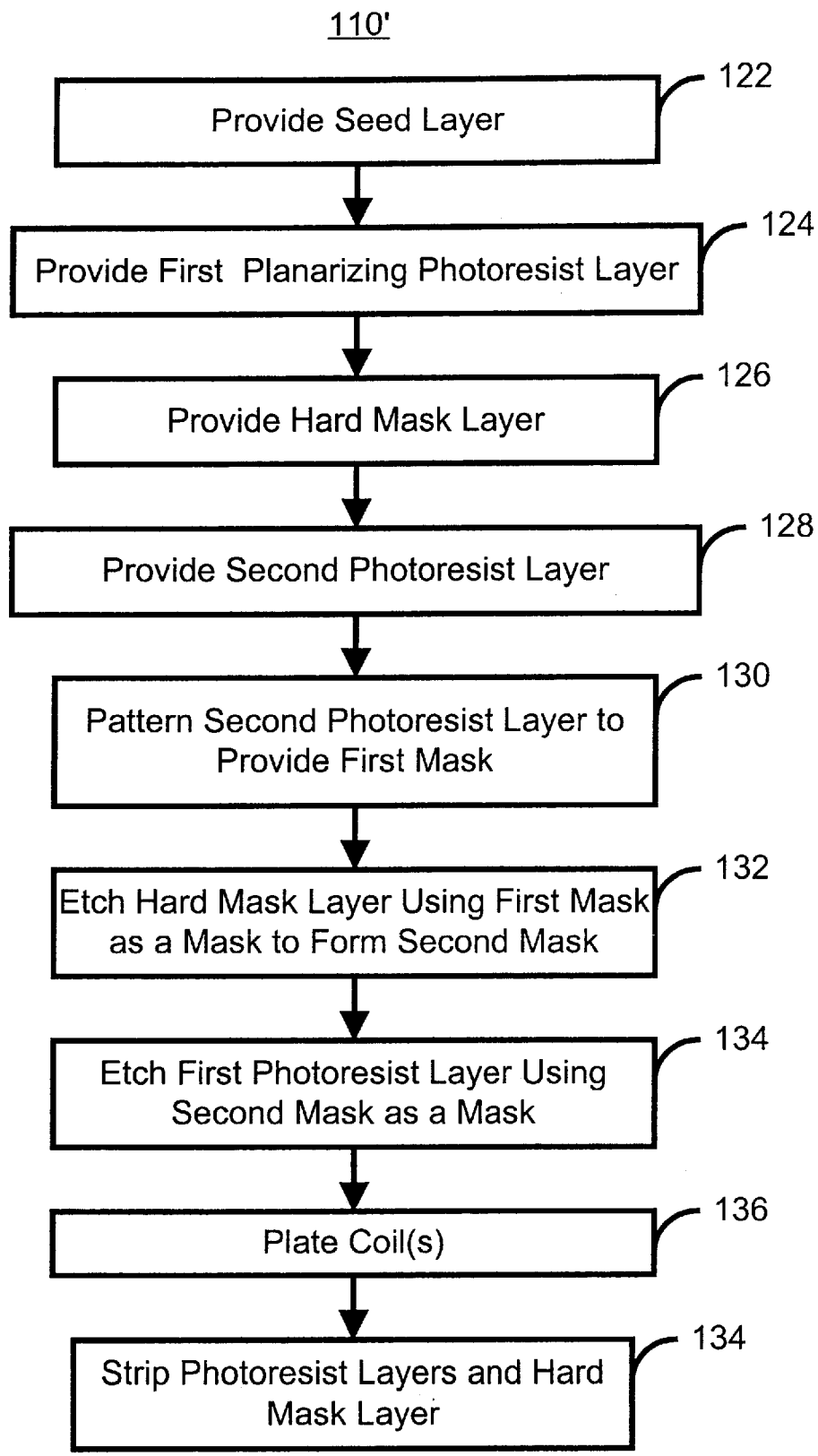
FIG. 4B is a more detailed flow chart depicting one embodiment of a method in accordance with the present invention for providing a more efficient writer.
Figure 5A:
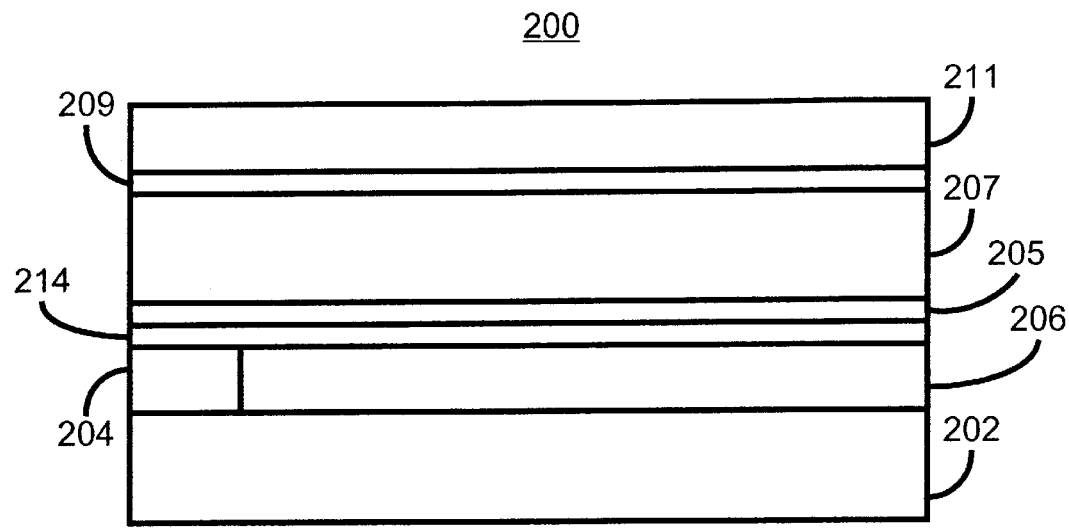
FIGS. 5A–5F depict one embodiment of a writer in accordance with the present invention during fabrication.

FIG. 4B depicts a more detailed flow chart of one embodiment of a method 112' in accordance with the present invention for providing the coils using the hard mask. The method 112' will also be described in conjunction with FIGS. 5A–5F, which depict one embodiment of a writer 200 in accordance with the present invention during fabrication. The method 112' commences after the first insulator and optional pedestal have been provided in steps 104 and 106, respectively and planarized in step 108 and after the write gap has been provided in step 110. A seed layer, such as Cu or a bilayer of Ti and Cu is deposited, via step 122. A first layer of photoresist is provided, via step 124. Preferably, the photoresist is spun onto the surface of the writer 200. Thus, the first photoresist layer provided in step 124 acts to make the exposed surfaces of the writer 200 planar. A hard mask layer is then provided, via step 126. The hard mask layer is preferably deposited using a CVD process. In a preferred embodiment, the hard mask layer is $SiO_2$. A second layer of photoresist is then provided on the hard mask layer, via step 128. FIG. 5A depicts the writer 200 after step 128 has been performed. Thus, the writer includes a first pole 202, a pedestal 204, a first insulator 206, and the write gap layer 214. The seed layer 205, the first, planarizing photoresist layer 207, the hard mask layer 209 and the second photoresist layer 211 are also depicted. As depicted in FIG. 5A, the second photoresist layer 211 is preferably significantly thinner than the first photoresist layer 207 in part because the second photoresist layer 211 need not be planarized to account for the underlying topography of the writer 200. Instead, the first photoresist layer 207 accounts for this topography.

Figure 5B:
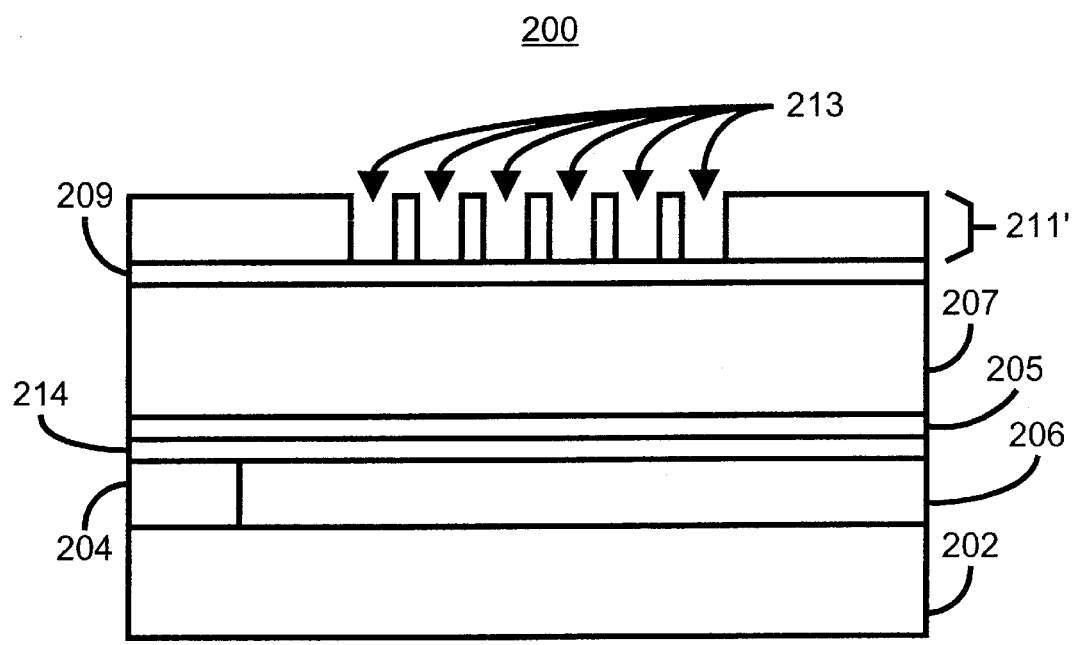

The second photoresist layer is then patterned, via step 130. Step 130 is preferably performed using conventional photolithography. FIG. 5B depicts the writer 200 after step 130 has been performed. As can be seen, the second photoresist layer 211' has developed apertures 213. Thus, the second photoresist layer 211' acts as a mask.

Figure 5C:
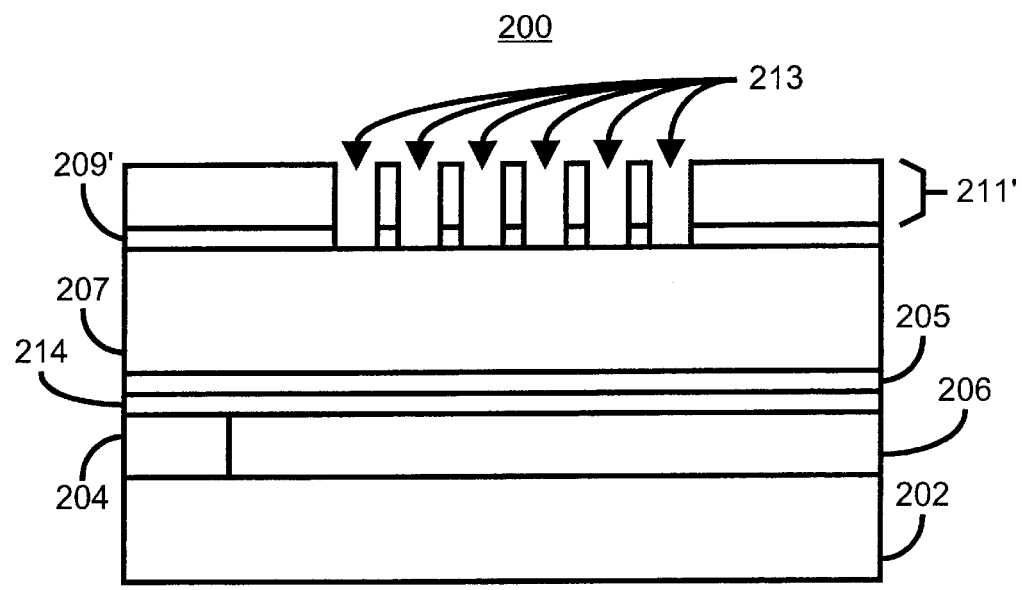
Figure 5D:
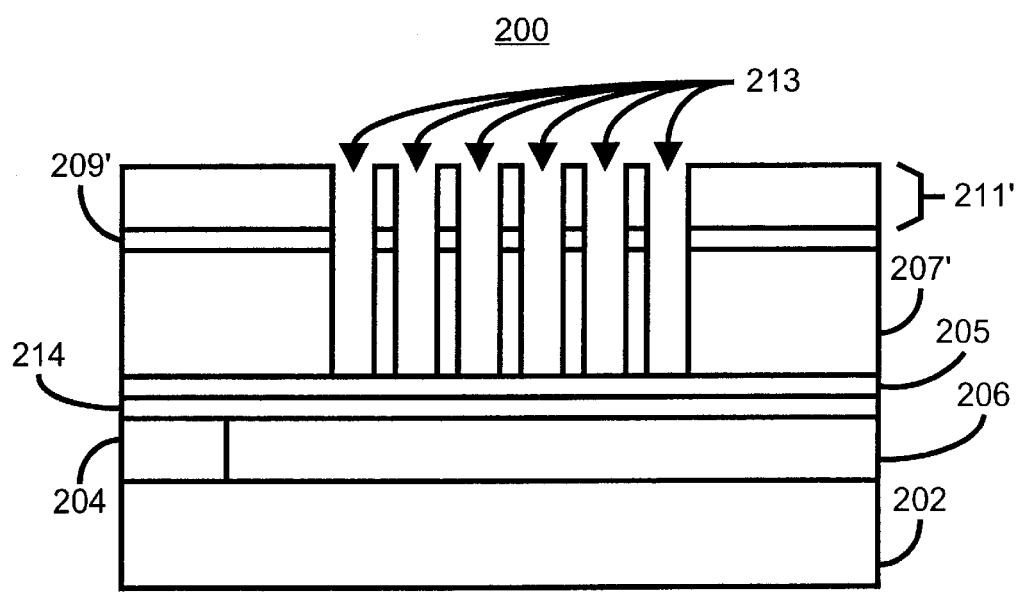

The hard mask layer is then etched, via step 132. Preferably the etch in step 132 is a reactive ion etch ("RIE"). For example, in a preferred embodiment, $CHF_3$ is used as an etchant. Thus, the pattern from the second photoresist layer 209' is transferred to the hardmask layer. FIG. 5C depicts the writer 200 after the hard mask layer 209' has been etched to form a second mask. Thus, the apertures 213 in the second photoresist layer 211' have been transferred to the hard mask layer 209'. Using the hard mask layer 209' as well as the second photoresist layer 211' as masks, the first photoresist layer 207 is patterned, via step 134. Preferably, step 134 is performed using a RIE. Preferably such an etch would use oxygen plasma as an etchant. FIG. 5D depicts the writer 200 when the second photoresist layer 207' has been etched. Thus, apertures 215 have been developed in second photoresist layer 207'.

Figure 5E:
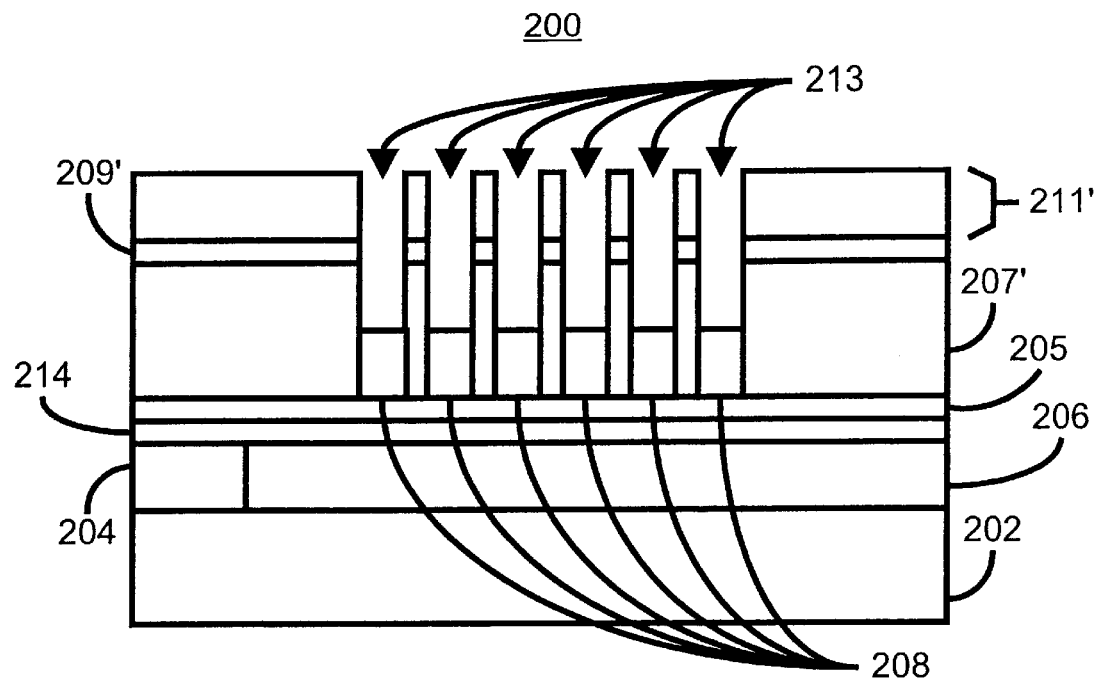

The coil is then plated, via step 136. FIG. 5E depicts the writer 200 after the coil 208 has been plated. Because of the presence of the first photoresist layer 207', the hard mask layer 209' and the second photoresist layer 211', which act as masks, the coil 208 can be plated as desired. Because of the use of the hard mask layer 209', as well as the first photoresist layer 207' and the second photoresist layer 211', the coil 208 can be plated with a narrower pitch. In a preferred embodiment, the pitch of the coil 208 can be 1.2 microns or less. In addition, the use of the first photoresist layer 209', the hard mask layer 209' and the second photoresist layer 211' can account for topography below the coil 208. Thus, the fabrication of the writer 200 is simpler and better. The photoresist layers 207' and 211' and the hard mask layer 209' may then be removed, via step 138. The seed layer 205 may also be etched. The fabrication of the writer 200 can then be completed.

Figure 5F:
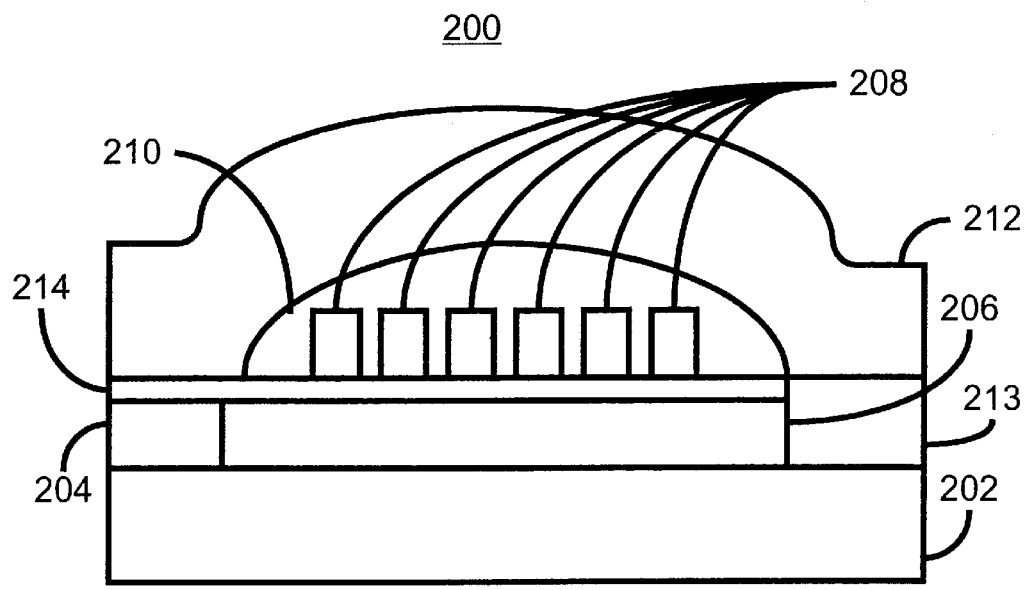

FIG. 5F depicts the writer 200 as completed. For clarity, the remaining portions of the seed layer 205 are not shown in FIG. 5F. The writer 200 also includes a second insulator 210 and a second pole 212. In addition, the second pole 212 has been coupled with the first pole 202 through layer 213. Although not depicted, the writer 200 could include a second coil layer. In addition, although depicted as a pedestal defined zero throat writer, the writer 200 could be a pedestal defined zero throat writer or a second insulator zero throat defined writer. As discussed above, because of the use of the hard mask layer 209' and the photoresist layers 207' and 211', the coil 208 can be have a smaller pitch and topography of the writer 200 can be accounted for. Thus, the yoke of the writer 200 can be shorter than a conventional writer. As a result, the efficiency and speed of the writer 200 is improved.

Figure 6A:
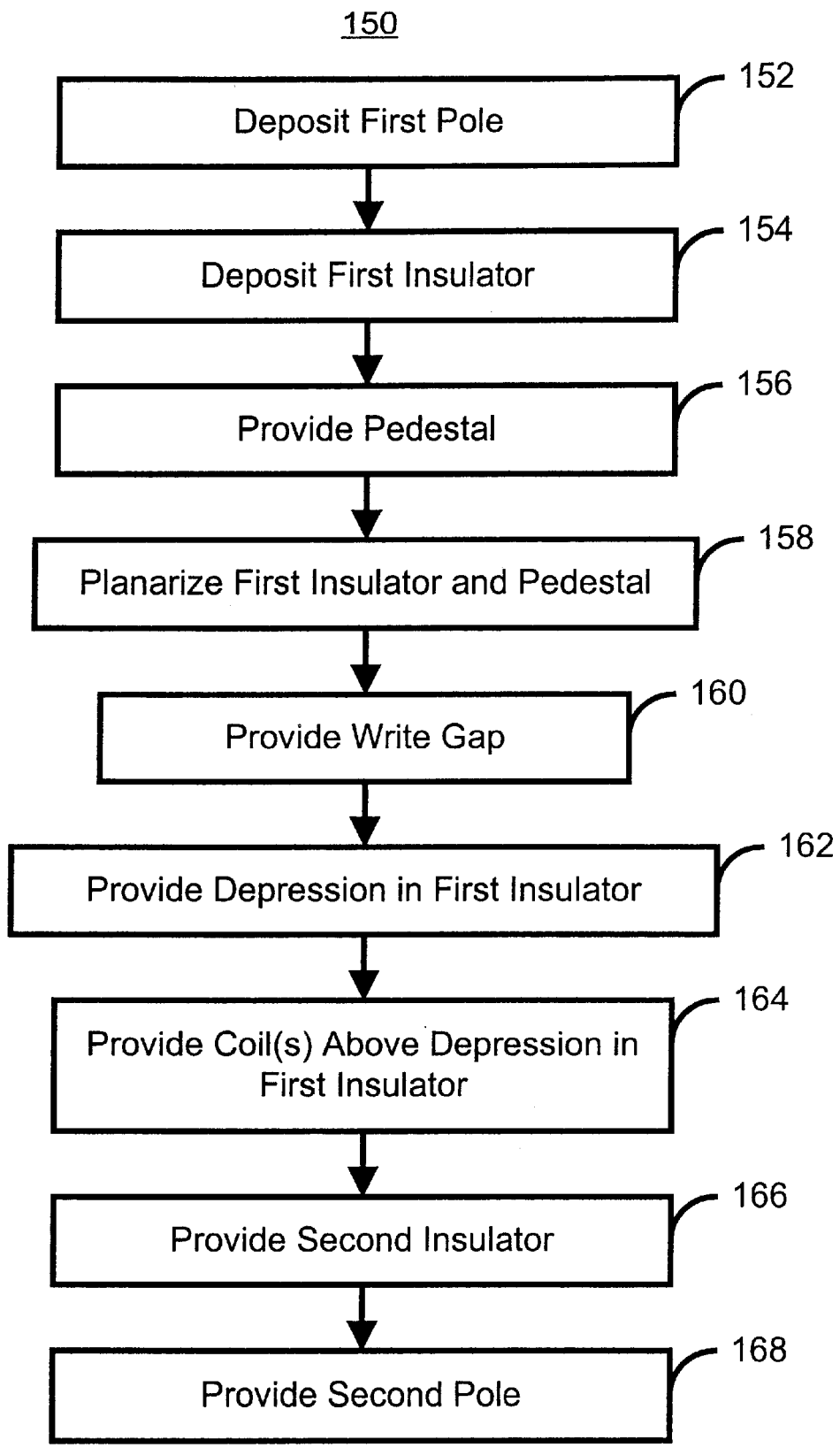
FIG. 6A is a high-level flow chart depicting one embodiment of a method in accordance with the present invention for providing a more efficient pedestal defined zero throat writer.

FIG. 6A depicts one embodiment of a method 150 in accordance with the present invention for providing a pedestal defined zero throat writer. The method 150 provides a writer which is capable of having a coil that is closer to the pedestal and which has the benefits of a pedestal defined zero throat writer. The first pole is provided, via step 152. The first insulator is provided, via step 154. The pedestal is provided, via step 156. The first insulator and pedestal may then be planarized, via step 158. The write gap is the provided, via step 160. A depression is then provided in the first insulator, via step 162. Step 162 could utilize a reactive or nonreactive ion beam etch to provide the depression. In addition, the write gap could be provided or after the depression is provided in the first insulator. The coil(s) are then provided above the depression, via step 164. The second insulator is provided, via step 166. The second pole is also provided, via step 168. Because the coils are provided in the depression, the profile of the coils with respect to the pedestal is less. Thus, the apex angle of the second insulator is reduced. As a result, the coils can be placed closer to the pedestal and, therefore, the ABS. Consequently, the writer formed using the method 150 is more efficient.

Figure 6B:
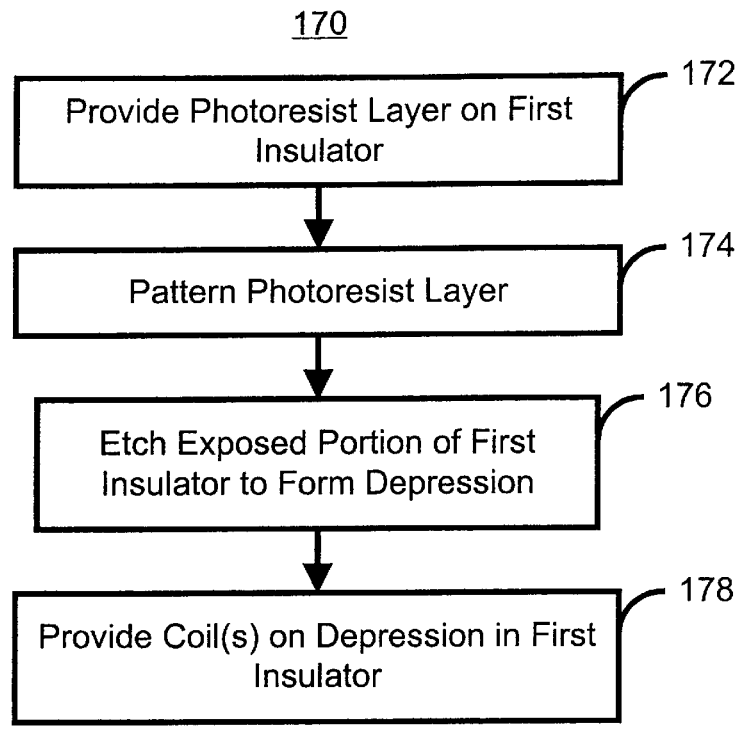
FIG. 6B is a more detailed flow chart depicting one embodiment of a method in accordance with the present invention for providing a more efficient pedestal defined zero throat writer.

FIG. 6B depicts one embodiment of a method 170 for providing the coils in the depression as discussed above in step 162 and 164. A photoresist mask is provided on the first insulating layer, via step 172. The mask preferably has an aperture where the depression in the first insulator is to be formed. The first insulator is then etched to the desired depth, thereby forming the depression, via step 174. In one embodiment, the first insulator includes approximately one micron of alumina and is etched to a thickness of approximately 0.5 micron in the depression. Also in a preferred embodiment, the etch is performed using a reactive ion beam etch that utilizes $CHF_3$ gas. The coil is then fabricated in the depression, via step 178. Thus, the bottom portion of the coil lies within the depression of the first insulator.

Figure 7:
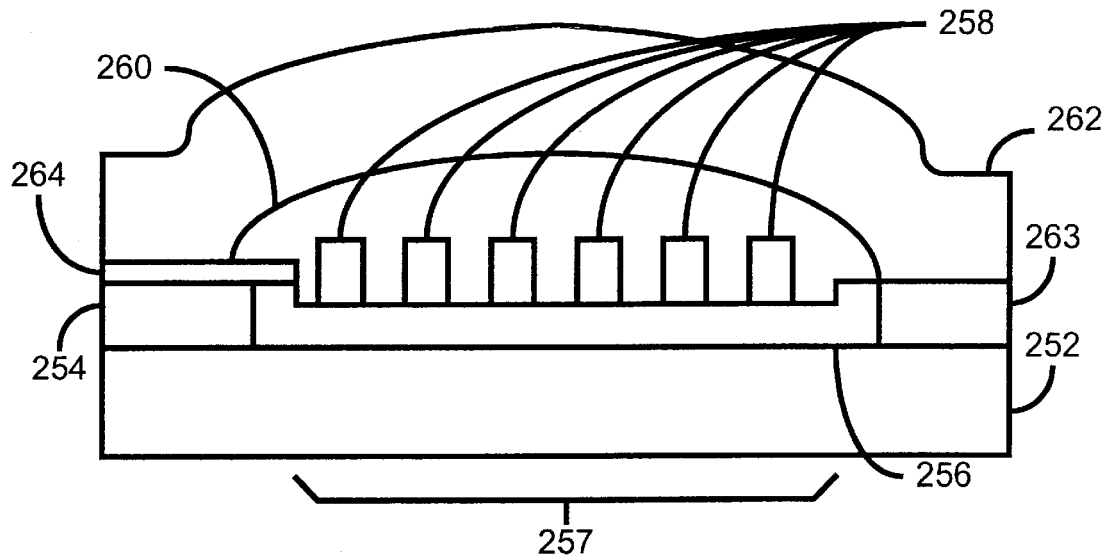
FIG. 7 is a diagram of one embodiment of a pedestal defined zero throat writer in accordance of the present invention.

FIG. 7 depicts one embodiment of a writer 250 formed in accordance with the methods 150 and 170. The writer includes a first pole 252, a pedestal 254, a first insulator 256, a coil 258, a second insulator 260, a second pole 262 and a write gap 264. The second pole 262 is coupled with the first pole 254 through layer 263. Note that for the writer 250, the write gap 264 is provided before the depression 257 is formed in the first insulator 256. However, nothing prevents the write gap 264 from being provided after the depression 257 is formed. Although not depicted, the writer 250 could include a second coil layer. As can seen in FIG. 7, the zero throat is defined by the pedestal 254, which diverges prior to the second insulator 260. The first insulator 256 includes a depression 257 therein. Because the coil 258 is provided in the depression 257, the profile of the coil 258 with respect to the pedestal 264 is less. Thus, the apex angle of the second insulator 260 is reduced. As a result, the coil 258 can be placed closer to the pedestal 254 and, therefore, the ABS. Consequently, the writer 250 is more efficient. In addition, the writer 250 has additional benefits, including a more controlled track width and better overwrite performance, because it is a pedestal defined zero throat writer.

Figure 8:
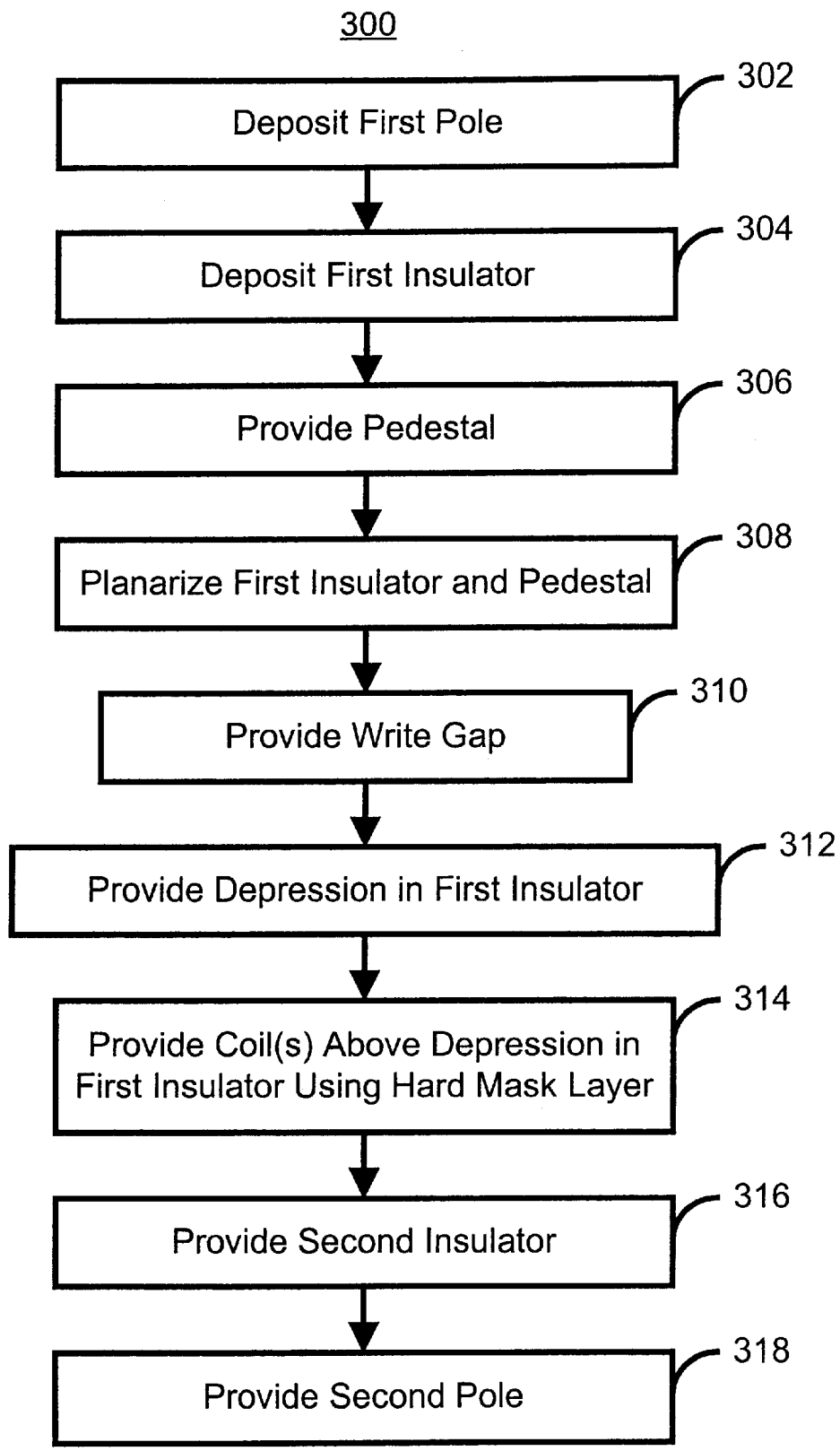
FIG. 8 is a high-level flow chart depicting one embodiment of a method in accordance with the present invention for providing a more efficient pedestal defined zero throat writer.

FIG. 8 depicts a more detailed flow chart of a preferred embodiment of a method 300 in accordance with the present invention. The method 300 results in a writer having the benefits of a writer formed using the method 100 and the method 150. The method 300 preferably provides a writer which is capable of having a coil that is closer to the pedestal, which has the benefits of a pedestal defined zero throat writer, and which has a coil having a narrower pitch. However, the method 300 could also be used to provide a writer which is not a pedestal defined zero throat writer.

The first pole is provided, via step 302. The first insulator is provided, via step 304. The pedestal is provided, via step 306. The first insulator and pedestal may then be planarized, via step 308. The write gap layer is provided, via step 310. A depression is provided in the first insulator, via step 312. Step 312 may utilize a reactive or nonreactive ion beam etch to provide the depression. Step 312 thus preferably utilizes steps 172, 174 and 176 of the method 170 described in FIG. 6B. Referring back to FIG. 8, the write gap could be provided after the depression is provided. The coil(s) are then provided above the depression and using a hard mask layer, via step 314. Step 314 is preferably performed using the method 112' described in FIG. 4B. Thus, the coil provided using the method 300 both has a lower profile because it is fabricated in the depression and has a narrower pitch. The second insulator is provided, via step 316. The second pole is also provided, via step 318. Because the coils are provided in the depression, the profile of the coils with respect to the pedestal is less. Thus, the apex angle of the second insulator is reduced. As a result, the coils can be placed closer to the pedestal and, therefore, the ABS. In addition, above, because of the use of the hard mask layer and, in a preferred embodiment, the photoresist layers described in FIGS. 4B and 5A–F, the coil can be have a smaller pitch and topography of the writer can be accounted for. Thus, the yoke of the writer made using the method 300 can be shorter than a conventional writer. As a result, the efficiency and speed of the writer is improved.

Figure 9:
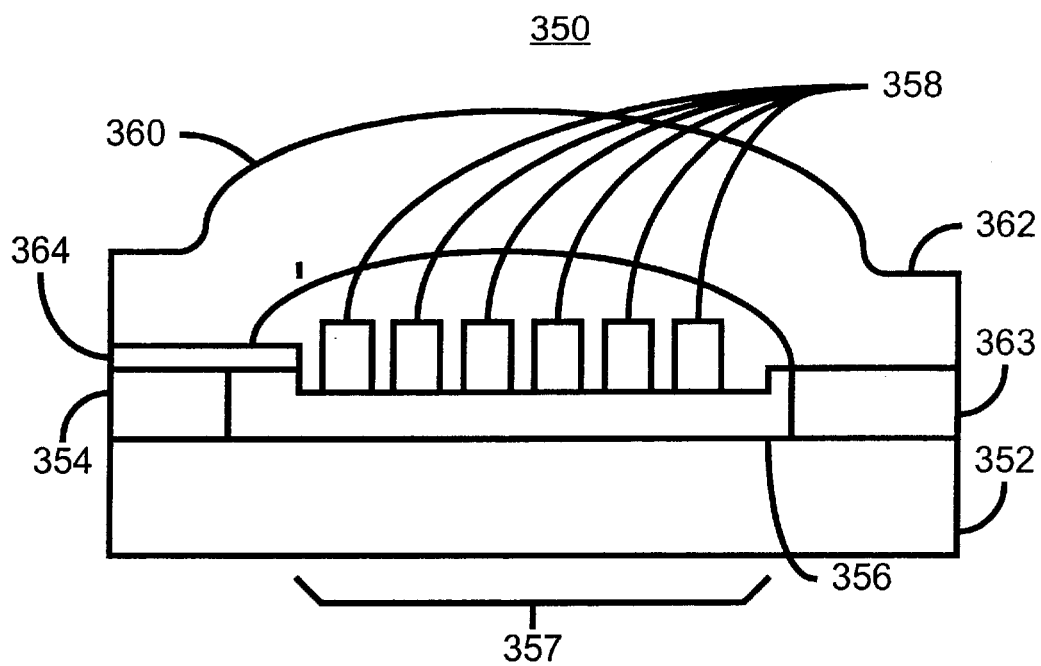
FIG. 9 is a diagram of another embodiment of a pedestal defined zero throat writer in accordance of the present invention.

FIG. 9 depicts one embodiment of a writer 350 formed in accordance with the method 300. The writer includes a first pole 352, a pedestal 354, a first insulator 356, a coil 358, a second insulator 360, a second pole 362 and a write gap 364. The second pole 362 is coupled to the first pole 352 through layer 363. Athough not depicted, the writer 350 could include a second coil layer. The first insulator 356 includes a depression 357 therein. Note that for the writer 350, the write gap 364 is provided before the depression 357 is formed in the first insulator 356. However, nothing prevents the write gap 364 from being provided after the depression 357 is formed. Because the coil 358 is provided in the depression. 357, the profile of the coil 358 with respect to the pedestal 364 is less. Thus, the apex angle of the second insulator 360 is reduced. As a result, the coil 358 can be placed closer to the pedestal 354 and, therefore, the ABS. Consequently, the writer 350 is more efficient. Moreover, the pitch of the coil 358 is less, making the writer 350 more efficient. The writer 350 may also have the benefits of a pedestal defined zero throat writer, including a more controlled track width and better overwrite performance.

Figure 10:
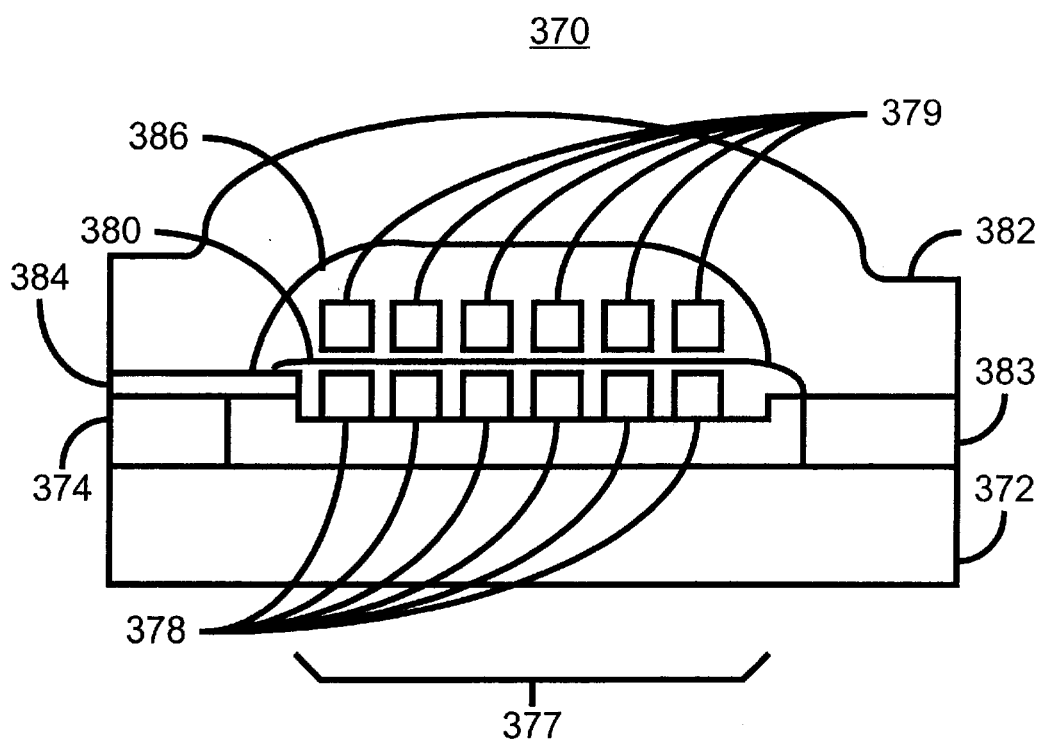
FIG. 10 is a diagram of another embodiment of a pedestal defined zero throat writer in accordance of the present invention having two layers of coils.

FIG. 10 depicts another embodiment of a writer 370 formed in accordance with the method 300. The writer 370 is used to demonstrate that the methods 100, 112', 150, 170 and 300 could be used with a writer having multiple layers of coils. Thus, the writer 370 includes a first pole 372, a pedestal 374, a first insulator 376, a coil 378, a second insulator 380, a second pole 382 and a write gap 384. The second pole 382 is coupled to the first pole 372 through layer 383. The writer 370 also includes a second coil layer 379 and a third insulator 386. The first insulator 376 includes a depression 377 therein. Because the coils 378 and 379 are provided in (e.g. above) the depression 357, the profile of the coils 378 and 379 with respect to the pedestal 374 is less. Thus, the apex angle of the second insulator 380 is reduced. As a result, the coils 378 and 379 can be placed closer to the pedestal 374 and, therefore, the ABS. Consequently, the writer 370 is more efficient. Moreover, the pitch of the coils 378 and 379 is less, making the writer 370 more efficient. The writer 370 may also have the benefits of a pedestal defined zero throat writer, including a more controlled track width and better overwrite performance.

Figure 11:
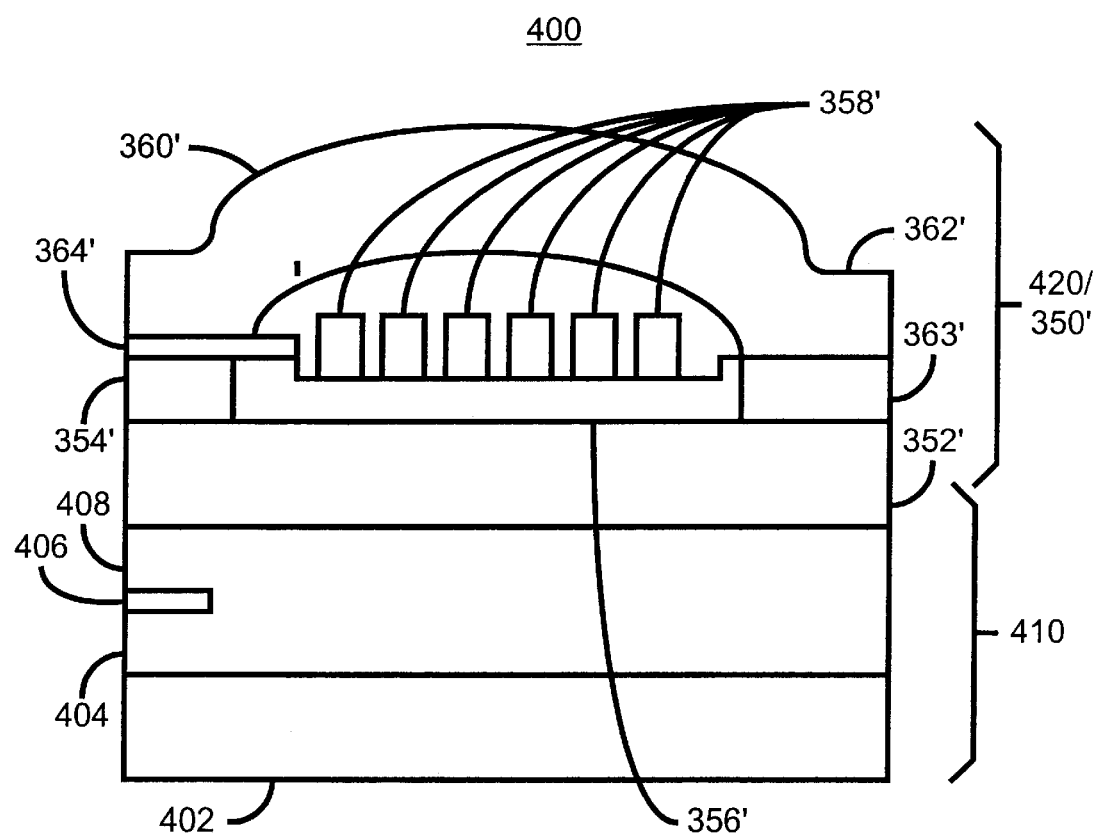
FIG. 11 depicts on embodiment of a merged head including a reader and one embodiment of a writer in accordance with the present invention.

FIG. 11 depicts a merged head 400 including a reader 410 and a writer 420. Preferably, the writer is one of the writers 200, 250, 350 or 370. The writer shown is 350', which corresponds to the writer 350. In addition, the merged head 400 includes a first shield 402, a first read gap 404, a read sensor 406 and a second read gap 408. In the merged head 400, the first pole 372' also functions as the second shield for the reader 410. Thus, the writers 200, 250, 350 and 370 in accordance with the present invention can be incorporated into a merged head 400 and provide the merged head with the benefits of the writers 200, 250, 250 and 370, respectively.

A method and system has been disclosed for an inductive writer having improved performance due to properties of its coil. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing pedestal-defined zero throat writer comprising:
   (a) providing a first pole;
   (b) providing a pedestal coupled to a first portion of the first pole, the pedestal defining a zero-throat position for the writer;
   (c) providing a first insulator covering a second portion of the first pole, the first insulator having a depression therein, the depression being formed by removing a portion of the first insulator to a desired depth layer;
   (d) providing a coil including a plurality of turns directly on the depression of the first insulator;
   (e) providing a second insulator covering at least the coil;
   (f) providing a second pole on at least the second insulator, a first portion of the second pole being coupled with the first pole, and
   (g) providing a write gap separating the pedestal from a second portion of the second pole.

2. The method of claim 1 wherein the first insulator-providing step (c) further includes the step of:
   (c1) depositing the first insulating layer;
   (c2) planarizing the first insulating layer; and
   (c3) etching a portion of the first insulating layer to form the depression therein.

3. The method of claim 2 wherein the plurality of turns are provided using a hard mask layer on a photoresist layer, a portion of the hard mask layer and a portion of the photoresist layer defining a plurality of spaces between the plurality of turns of the coil.

4. The method of claim 1 wherein the plurality of turns of the coil has a pitch of less than or equal to 1.2 microns.

5. The method of claim 1 wherein the depression has a depth of 0.5 micron.

6. A method for providing pedestal-defined zero throat writer comprising:
   (a) providing a first pole;
   (b) providing a pedestal coupled to a first portion of the first pole, the pedestal defining a zero-throat position for the writer;
   (c) providing a first insulator covering a second portion of the first pole, the first insulator having a depression therein;
   (d) providing a coil including a plurality of turns on the depression of the first insulator, wherein the plurality of turns of the coil is further formed by providing a photoresist layer on the first insulating layer, providing the hard mask layer on the photoresist layer, providing a second photoresist layer on the hard mask layer, patterning the second photoresist layer using a first etching step, etching the hard mask layer using a second etching step, etching the second photoresist layer using a third etching step; plating the plurality of turns of the coil and removing the photoresist layer;
   (e) providing a second insulator covering at least the coil;
   (f) providing a second pole on at least the second insulator, a first portion of the second pole being coupled with the first pole, and
   (g) providing a write gap separating the pedestal from a second portion of the second pole.

* * * * *